US010795700B2

(12) United States Patent
Nguyen et al.

(10) Patent No.: US 10,795,700 B2
(45) Date of Patent: Oct. 6, 2020

(54) VIDEO-INTEGRATED USER INTERFACES

(71) Applicant: Accenture Global Solutions Limited, Dublin (IE)

(72) Inventors: David H. Nguyen, Santa Clara, CA (US); Allison Youngdahl, Mountain View, CA (US); Shawn D. Meyer, Bloomington, MN (US); Kunal Mehta, Minneapolis, MN (US); Ziqiu Li, San Jose, CA (US); Rob W. Honts, Austin, TX (US); David M. Klimek, North Bethesda, MD (US); Robert Freele, Grandbend (CA); Stephanie Anderson, Minneapolis, MN (US)

(73) Assignee: Accenture Global Solutions Limited, Dublin (IE)

( * ) Notice: Subject to any disclaimer, the term of this patent is extended or adjusted under 35 U.S.C. 154(b) by 136 days.

(21) Appl. No.: 15/222,141

(22) Filed: Jul. 28, 2016

(65) Prior Publication Data

US 2018/0329722 A1    Nov. 15, 2018

(51) Int. Cl.
*G06F 9/451*    (2018.01)
*G06F 3/0484*   (2013.01)
(Continued)

(52) U.S. Cl.
CPC ........... *G06F 9/453* (2018.02); *G06Q 30/016* (2013.01); *G06F 3/04842* (2013.01); *G06F 3/04847* (2013.01); *G11B 27/34* (2013.01)

(58) Field of Classification Search
CPC ............. G06F 3/04842; G06F 3/04847; G06F 3/04812; G06F 9/453; G11B 27/34
See application file for complete search history.

(56) References Cited

U.S. PATENT DOCUMENTS 5,065,813 A * 11/1991 Berkeley ............ G05D 23/1917
                                                    165/11.1
5,535,422 A *  7/1996 Chiang ................... G06F 9/543
                                                    715/709

(Continued)

OTHER PUBLICATIONS

Australian Office Action in Australian Application No. 2017208216, dated Dec. 19, 2017, 7 pages.

(Continued)

*Primary Examiner* — Nicholas Klicos
(74) *Attorney, Agent, or Firm* — Fish & Richardson P.C.

(57) ABSTRACT

The disclosure relates to methods, systems, and apparatuses, including computer programs on a computer storage medium, for generating a dynamic user interface and playing a video within the dynamic user interface. A dynamic computer user guidance system includes a user interface generation module that causes a display of a dynamic user interface. The dynamic user interface provides a plurality of instructions via one or more dynamic elements. The user interface generation module generates a user interface status indicator. The system includes a video control module that an integrated video to play in the dynamic user interface in response to receipt of the user interface status indicator. The video control module generates a video status indicator. A synchronization module communicably coupled to the user interface generation module and the video control module synchronize a state change in one or more dynamic elements in response to receipt of the video status indicator.

15 Claims, 11 Drawing Sheets

(51) Int. Cl.
  *G06Q 30/00* (2012.01)
  *G11B 27/34* (2006.01)

(56) References Cited

U.S. PATENT DOCUMENTS

| | | | | |
|---|---|---|---|---|
| 7,853,492 | B1* | 12/2010 | Kirklin | G06Q 30/06 280/79.2 |
| 8,027,745 | B1* | 9/2011 | Freeze | G06Q 10/06 700/106 |
| 8,590,777 | B1* | 11/2013 | Roman | G06Q 10/08 235/375 |
| 2002/0054088 | A1* | 5/2002 | Tanskanen | G06Q 40/04 715/744 |
| 2003/0028399 | A1* | 2/2003 | Davis | G06F 19/3418 705/2 |
| 2005/0043965 | A1* | 2/2005 | Heller | G06F 19/326 705/2 |
| 2008/0003555 | A1 | 1/2008 | Ekvall et al. | |
| 2009/0106605 | A1* | 4/2009 | Kuchibhotla | G06F 11/0748 714/47.2 |
| 2009/0254457 | A1* | 10/2009 | Folsom | G06Q 10/06 705/26.1 |
| 2010/0087883 | A1* | 4/2010 | Sullivan | A61B 5/0002 607/5 |
| 2010/0180292 | A1* | 7/2010 | Epstein | H04N 5/44513 725/32 |
| 2010/0235743 | A1* | 9/2010 | Rahman | G06F 16/4393 715/716 |
| 2011/0179624 | A1* | 7/2011 | Sexton | A47B 97/00 29/428 |
| 2012/0235821 | A1* | 9/2012 | DiBenedetto | A63B 24/0062 340/573.1 |
| 2012/0258438 | A1* | 10/2012 | Cohen | G09B 7/00 434/365 |
| 2012/0304059 | A1 | 11/2012 | McCloskey | |
| 2013/0262464 | A1 | 10/2013 | Klane et al. | |
| 2013/0335611 | A1* | 12/2013 | Roman | G06F 17/30247 348/333.01 |
| 2013/0339039 | A1* | 12/2013 | Roman | G06Q 50/22 705/2 |
| 2014/0162598 | A1* | 6/2014 | Villa-Real | H04M 1/66 455/411 |
| 2014/0234809 | A1 | 8/2014 | Colvard | |
| 2014/0274313 | A1* | 9/2014 | Bala | G06Q 30/06 463/25 |
| 2014/0298162 | A1* | 10/2014 | Cohen | G09B 5/02 715/234 |
| 2015/0120389 | A1 | 4/2015 | Zhang et al. | |
| 2015/0170546 | A1 | 6/2015 | Kirenko | |
| 2015/0243329 | A1* | 8/2015 | Hadorn | H04N 21/44209 386/230 |
| 2016/0066064 | A1* | 3/2016 | Chesluk | H04N 21/233 725/93 |
| 2016/0205431 | A1 | 4/2016 | Avedissian et al. | |
| 2016/0284014 | A1* | 9/2016 | Adel | G06Q 30/0639 |
| 2016/0300292 | A1* | 10/2016 | Shacham | G06Q 30/0643 |
| 2017/0076349 | A1* | 3/2017 | Rohach Miller | G06Q 30/0621 |
| 2017/0085545 | A1* | 3/2017 | Lohe | H04L 63/062 |
| 2017/0094021 | A1* | 3/2017 | Brech | H04L 67/34 |
| 2017/0097621 | A1* | 4/2017 | Ackmann | G05B 19/042 |
| 2017/0118507 | A1* | 4/2017 | Latacz | G11B 27/007 |
| 2018/0048865 | A1 | 2/2018 | Taylor et al. | |

OTHER PUBLICATIONS

Australian Office Action for Application No. 2017208216, dated Oct. 3, 2018, 13 pages.
Australian Office Action for Application No. 2017208216, dated Apr. 27, 2018, 8 pages.
AU Office Action in Australian Application No. 2018282284, dated Mar. 4, 2020, 8 pages.

\* cited by examiner

VIDEO-INTEGRATED USER INTERFACES

TECHNICAL FIELD

The present application is related to computer generated user interfaces and in particular to computer generated user interfaces including video content integrated therein.

BACKGROUND

Computer programs (whether on laptops, tablets, or phones) are often accompanied with a user manual, showing users what is possible with the program, how to use the program, and how to troubleshoot the program when errors occur. The user manual can be in a physical book form or may include another computer program. Users have to translate the instructions and layout on the user manual with respect to what is displayed on the screen. As a result, the user may find it difficult to determine or coordinate what subsequent actions are required and what, if any missteps or problems, have occurred during the set up. The user may also find it difficult to trouble shoot where those issues have occurred.

Interactive video instructions, can automate the instruction process, but such instructions while automating the translation have disadvantages associated with the rigid nature of the video content. Additionally, such instructions fail to provide direct insights on what trouble shooting steps a user should take and/or fail to provide targeted guidance on what a user should do in order to complete the setup and installation of a product or system.

SUMMARY

Implementations of the present disclosure are directed to methods, systems, and apparatuses, including computer programs encoded on a computer storage medium, for generating a dynamic user interface that plays a video within the dynamic user interface.

Certain implementations provide a dynamic computer user guidance system that includes a user interface generation module configured to cause a display of a dynamic user interface on a graphical user interface of an electronic computing device. The dynamic user interface provides a plurality of instructions via one or more dynamic elements. The user interface generation module is configured to generate a user interface status indicator. The dynamic computer user guidance system includes a video control module communicably coupled to the user interface generation module. The video control module is configured to cause playing of at least one integrated video in the dynamic user interface in response to receipt of the user interface status indicator. The status indicator provides data indicating a current state of the user interface. For example, the status indicator can indicate what step or sub-step in an instruction sequence the guidance system is at, specifying for example that the user interface is tracking a package, scanning a device, capturing an image, or checking a device connection. The video control module is configured to generate a video status indicator. The dynamic computer user guidance system also includes a synchronization module communicably coupled to the user interface generation module and the video control module. The synchronization module is configured to synchronize a state change in at least one of the one or more dynamic elements in response to receipt of the video status indicator from the video control module. The electronic computing device can include a mobile electronic computing device.

In some implementations, the user interface status indicator is based on receipt of a user input received through the user interface.

In some implementations, the video control module is configured to select the at least one integrated video from among a plurality of videos based on the user input.

In some implementations, the at least one dynamic element is configured to change colors.

In some implementations, the at least one dynamic element includes a pointer.

In some implementations, the video control module is configured to transmit the video status indicator in response to receipt of an input signal from a back-end system.

In some implementations, the back-end system generates the input signal in response to a delivery confirmation.

In some implementations, the video control module is configured to generate the video status indicator in response to receipt of an input signal from a peripheral device of the electronic computing device.

In some implementations, the peripheral device includes a camera.

In some implementations, the video control device is configured to analyze a photo captured by the camera to determine the integrated video to play.

In some implementations, the peripheral device includes a barcode scanner.

In some implementations, the peripheral device includes a microphone.

In some implementations, the peripheral device includes a heart rate monitor.

In some implementations, the video control module is configured to transmit the video status indicator in response to receipt of an input signal from a historic database having a data set of prior user error data stored thereon. The historic database can also suggest changes to the video library. For example, a common error can suggest a new framing for the existing video because the old one was prone to misinterpretation.

Certain implementations provide a computer-implemented method executed by one or more processors of an electronic computing device. The method includes causing, by the one or more processors, a display of a dynamic instructional user interface on a graphical user interface of the electronic device. The method includes generating, by the one or more processors, a user interface status indicator based on display content of the dynamic instructional user interface. The method includes causing, by the one or more processors, a video to play within the dynamic instructional user interface in response to the status indicator. The method includes generating, by the one or more processors, a plurality of video signals based on video content in the video. The method also includes adjusting, by the one or more processors, a dynamic element of the dynamic instructional user interface in response to at least one video signal of the plurality of video signals.

In some implementations, causing the display includes causing the display in response to receipt of a delivery notification from a back-end system.

In some implementations, the method includes receiving an input signal from a peripheral device communicably coupled to the mobile electronic device and changing the display content of the dynamic instructional user interface in response to receipt of the input signal.

In some implementations, the method includes capturing an image from a camera device of the electronic computing device, analyzing the image, and changing the display content of the dynamic instructional user interface based on the analysis. The electronic computing device includes a user interface and can include a mobile electronic computing device.

In some implementations, adjusting the dynamic element includes highlighting text.

Certain implementations provide a non-transitory computer-readable storage medium coupled to one or more processors and having instructions stored thereon which, when executed by the one or more processors, cause the one or more processors to perform operations including causing a display of a dynamic instructional user interface on a graphical user interface of the an electronic device, generating a user interface status indicator based on display content of the dynamic instructional user interface, causing a video to play within the dynamic instructional user interface in response to the status indicator, generating a plurality of video signals based on video content in the video, and adjusting a dynamic element of the dynamic instructional user interface in response to at least one video signal of the plurality of video signals.

It is appreciated that implementations in accordance with the present disclosure can include any combination of the aspects and features described herein. That is, implementations in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

BRIEF DESCRIPTION OF DRAWINGS

The drawings primarily are for illustrative purposes and are not intended to limit the scope of the inventive subject matter described herein. The drawings are not necessarily to scale; in some instances, various aspects of the inventive subjection matter disclosed herein may be shown enlarged in the drawings to facilitate an understanding of different features. In the drawings, like reference characters generally refer to like features (e.g. functionally similar and/or structurally similar elements).

The features and advantages of implementations of the inventive subject matter disclosed herein will become more apparent from the detailed description set forth below when taken in conjunction with the drawings.

DETAILED DESCRIPTION

Implementations of the present disclosure are generally directed to video integration platforms that enable dynamic instructional user interfaces to be implemented to provide dynamic responses and targeted guidance to a user. As described in further detail herein, the video is aware of the current state of rest of the dynamic instructional user interface and the rest of the dynamic instructional user interface is aware of the current state of the video. Accordingly, implementations of the present disclosure enable the user to know precisely what element of the instructional user interface the video is referring to when the video mentions an element.

FIGS. 1A-1I depict example screenshots in accordance with implementations of the present disclosure. The example screenshots of FIGS. 1A-1I depict screenshots of a mobile application of the dynamic user guidance system, which mobile application can be executed on an electronic computing device.

Figure 1A:
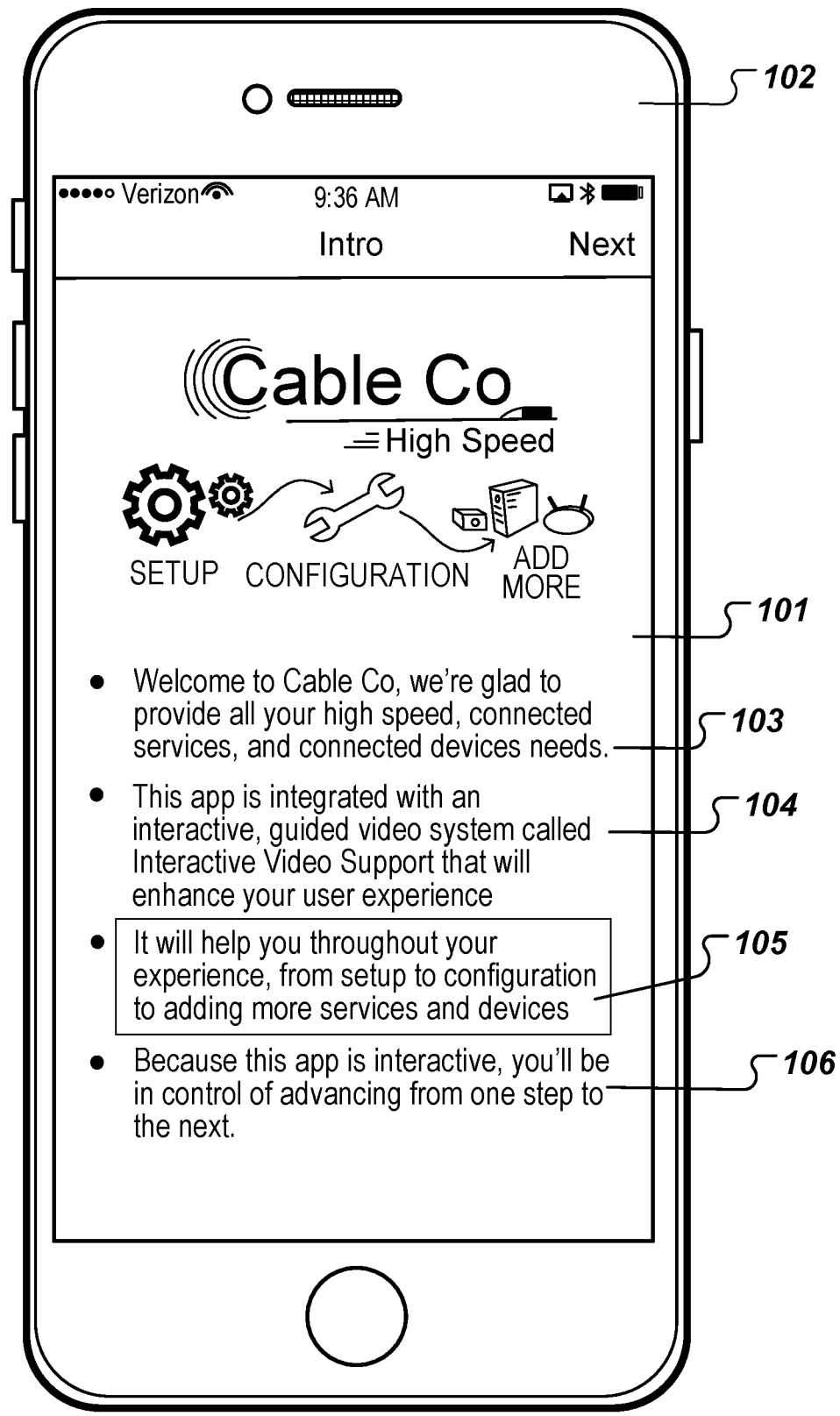
FIGS. 1A-1I depict example screenshots in accordance with implementations of the present disclosure.

FIG. 1A depicts an introductory screenshot of a dynamic user interface 101 displayed on the graphical user interface of a mobile electronic computing device 102. The dynamic user interface 101 interactively assists a user in the installation of a high speed internet cable modem. The dynamic user interface 101 includes a plurality of dynamic elements 103-106. In the illustrated scene of the dynamic user interface 101, the dynamic elements 103-106 are text based elements that are configured to change from a non-highlighted state to a highlight stated. As demonstrated in FIG. 1A, dynamic element 105 is in the highlighted state, while the remaining dynamic elements 103, 104, and 106 are not highlighted. As the dynamic user interface 101 moves through a series of instructions and changes appearances, for example as one or more of the dynamic elements changes from non-highlighted to highlighted and back, a user interface generation module that controls the dynamics of the dynamic user interface 101 generates user interface status indicators for each dynamic change achieved by interface 101. As discussed further herein, the user interface status indicators are used in implementations disclosed herein to provide notice of the current state of the user interface so that other aspects of the user interface can be appropriately adjusted, selected, or displayed. This information is also pertinent for video synchronization and modifications, as discussed further herein. The user interface status indicator information may be generated and retrieved by another component or it may be transmitted via the user interface generation module to another system or component communicably coupled to the user interface generation module.

Figure 1B:
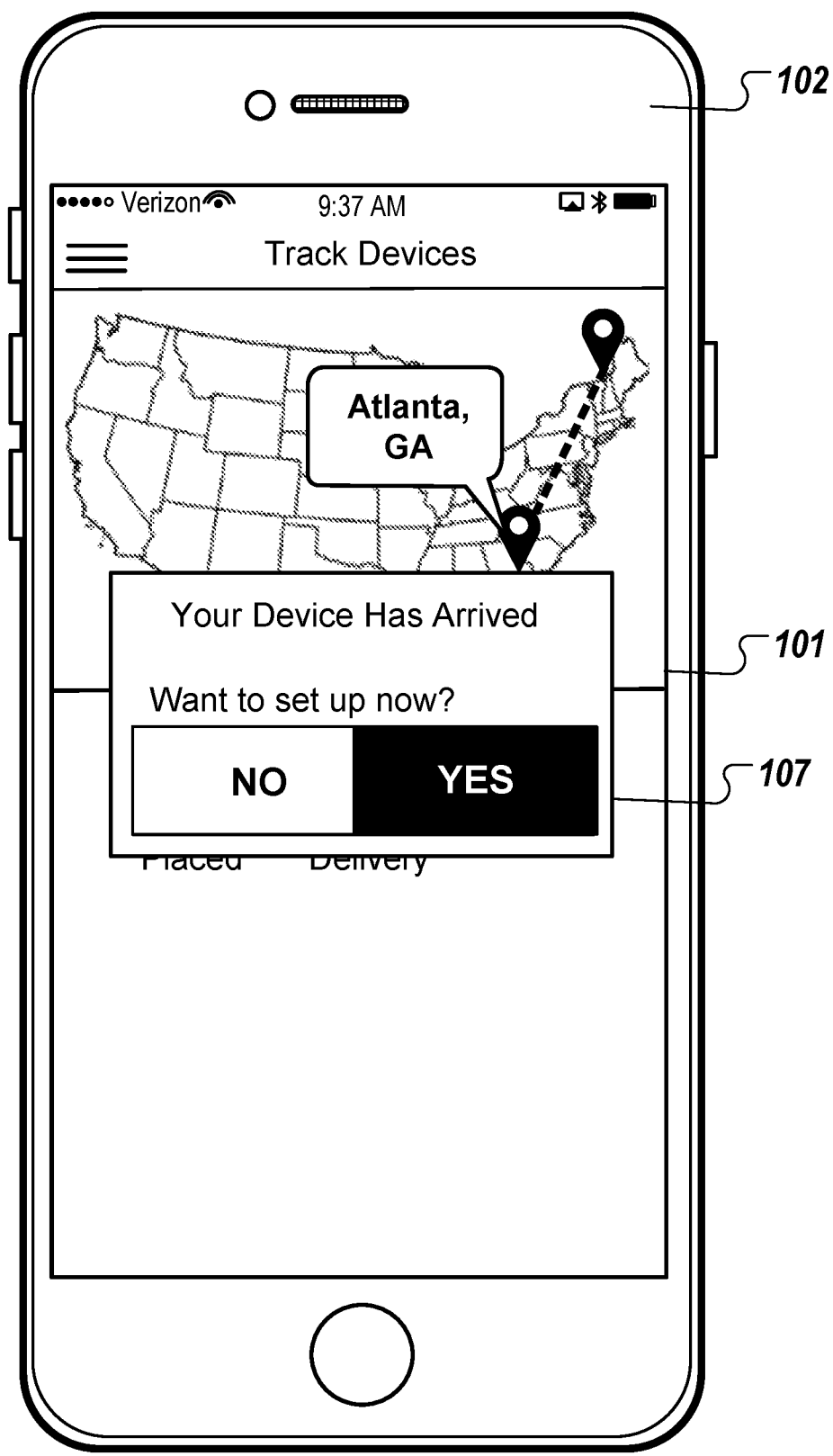

FIG. 1B depicts a scene of the user interface that is implemented in connection with delivery tracking of the high speed modem for which the user is receiving instructions. In particular, a back-end system is communicably coupled to the dynamic user interface 101 and provides a notification of the tracking status of the modem. More specifically, the dynamic user interface 101 may be opened and/or modified based on an electronic update received from the back-end system, which update indicates that the shipped components have been delivered. Accordingly, the user does not have to download or search for the appropriate installation instructions. Instead, the appropriate instructions are selected based on tracking of the package. In some implementations, the shipping status of the modem or other shipped items may be manually entered into a tracking database. In other implementations, the tracking updates may be provided in whole or in part via transmissions from a wireless radio transmitter coupled to the item(s) for tracking. Whether manually entered or automatically detected, the tracking information provided by the back-end system automates the alert and identifies the tracked object. The identification of the tracked item is used for selection of the appropriate content for display within the dynamic user interface 101 and may include information such as the model number of the tracked item. As demonstrated in FIG.

1B, the alert causes the dynamic user interface to display the dynamic arrival message 107. The user interface 101 is then further modified by the user selection of whether or not to initiate the setup of the device.

Figure 1C:
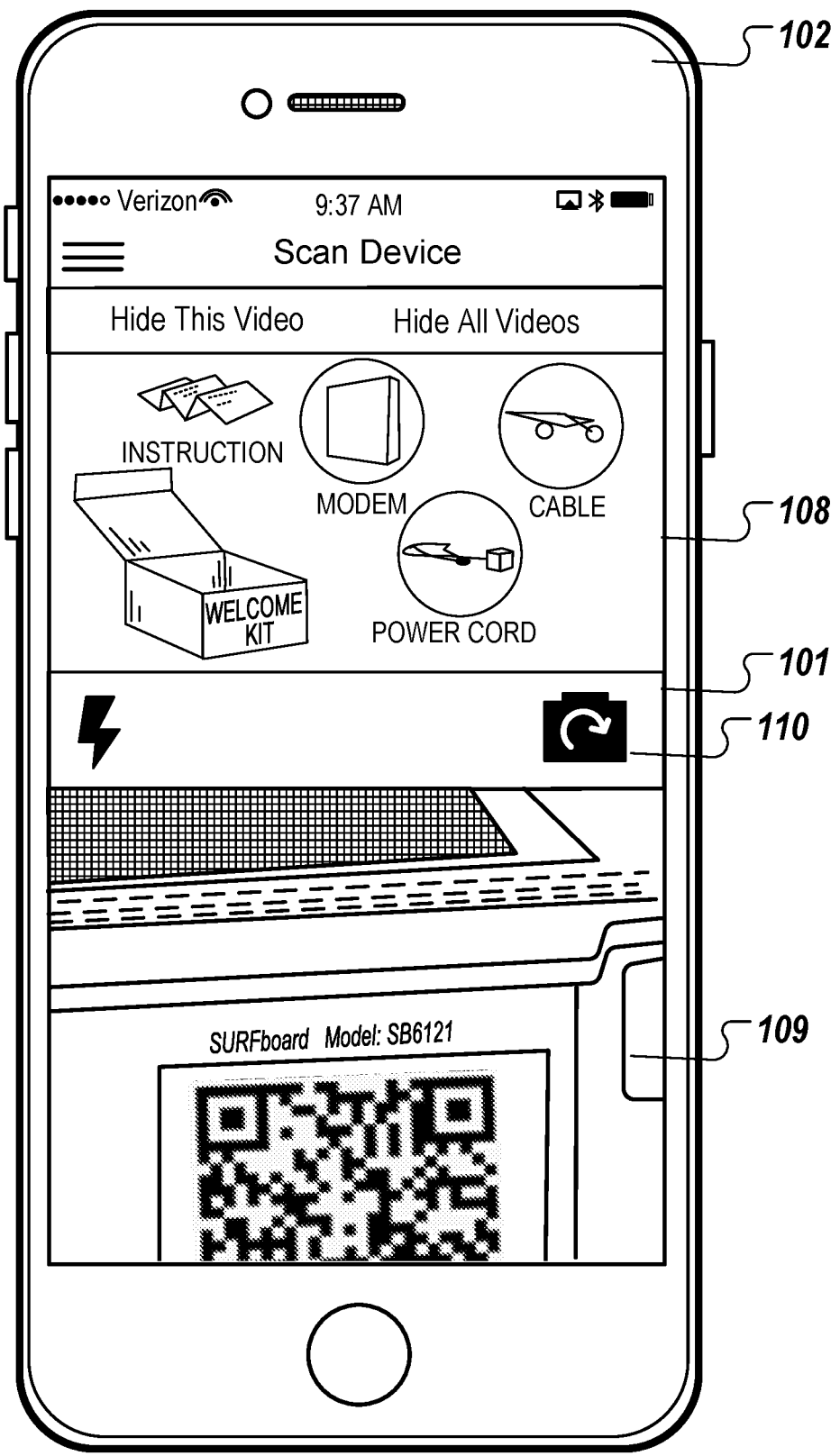

A user selection of YES generates a new user interface status indicator, which new user interface status indicator is communicated to a video control module configured to select and cause an integrated video 108 to be played in the user interface 101, as depicted in FIG. 1C. The integrated video 108 selected and played based on the user interface status indicator provides instructions on installation of the specific modem that was delivered. The integrated video 108 guides the user first through the unpacking phase and indicates what content should be included with the package. As the video 108 is playing, the video control module generates video status indicators based on the portion of the video currently being played. For example, the video may be coded with data that indicates that at a particular point or time in the video, the user is being instructed to scan a bar code. This unique status indicator that is produced based on the instant content of the video is obtained by the user interface generation module and causes the dynamic user interface 101 to change as shown in FIG. 1C, such that a camera interface 110 is provided therein. The camera interface 110 causes a camera application stored on the mobile electronic computing device 102 to open and the camera application 110 generates an image capture widow 109 as a subset of the user interface 101. The image capture window 109 shows whatever the camera of the mobile electronic computing device 102 is aimed at in a separate window of the user interface 101 than might normally be provided by the camera application so that the user can integrally use the application while the integrated video 108 continues to play within the dynamic user interface 101. The separate window may be shown in totality by scrolling in the user interface 101 or by hiding or minimizing the video.

Figure 1D:
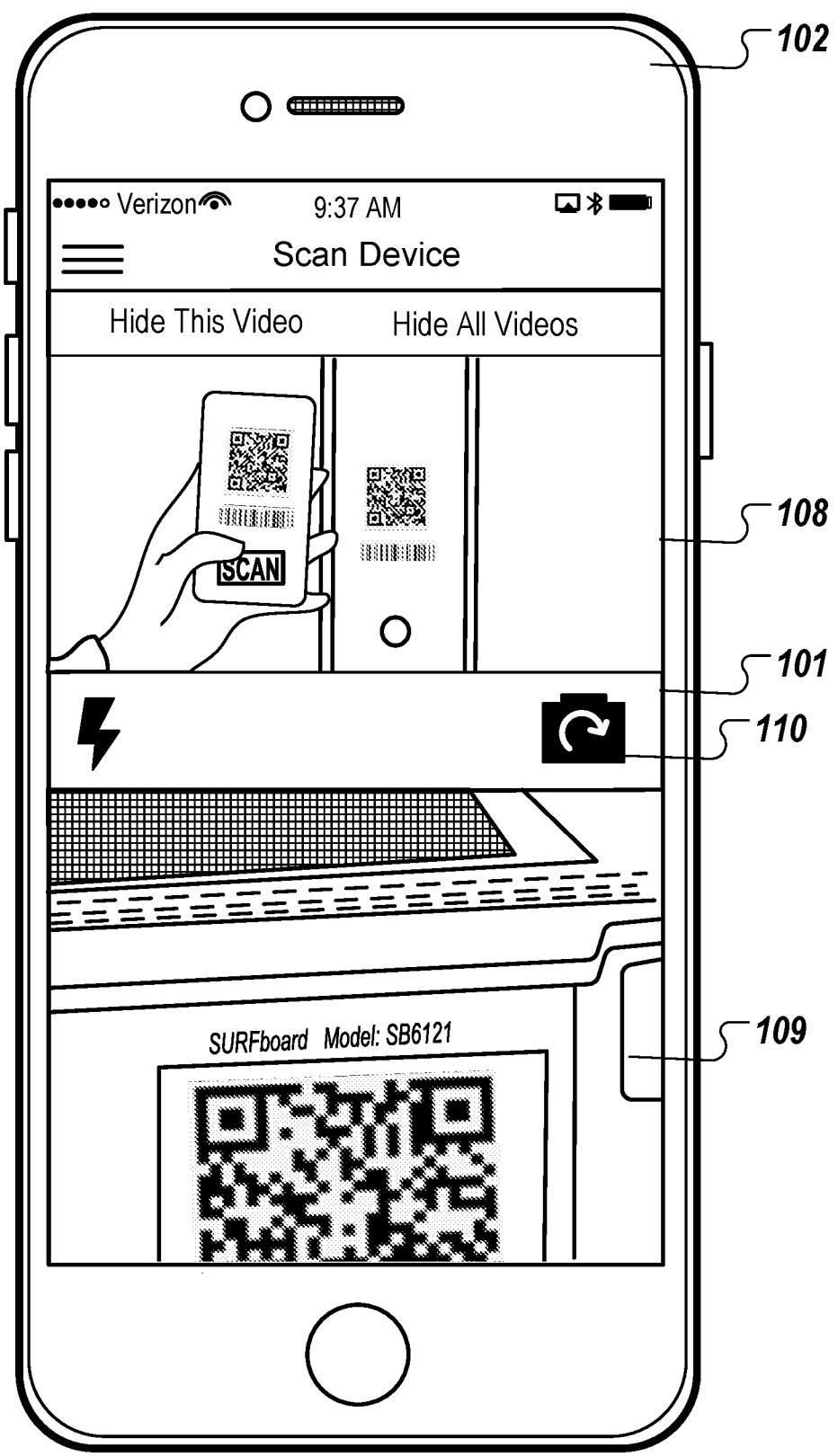

FIG. 1D depicts a scanning phase of the instructional system. The integrated video 108 continues to play as shown in FIG. 1D and instructs the user on what to scan and where to scan. The image capture window 109 and the camera interface 110 remain within the dynamic user interface 101 during this portion of the video as those dynamic elements are relevant to the current content of the integrated video 108. The current content of the integrated video 108 continues to provide inputs that update dynamic elements of the user interface 101. In a similar manner, as the user complete actions with the mobile electronic computing device 102, for example by scanning a QR code on the object via the image capture window 109 and the camera interface 110, the user interface generation module receives updates based on such scannings. The updates can be received and used by the video control module, to modify the video content being displayed. For example, if the user interface generation module receives an input from the camera interface 110 that indicates that the modem received was not the same as that provided by the shipping information in the delivery notification, then a different setup video may be retrieved and played as the integrated video 108. As such, the video control module remains aware of the current state of the dynamic user interface 101 and the dynamic user interface 101 is aware of the current state of the integrated video 108. As discussed further herein, a synchronization module may be implemented in accordance with particular embodiments to coordinate the information updates and status information received via the dynamic user interface 101 and the integrated video 108.

Figure 1E:
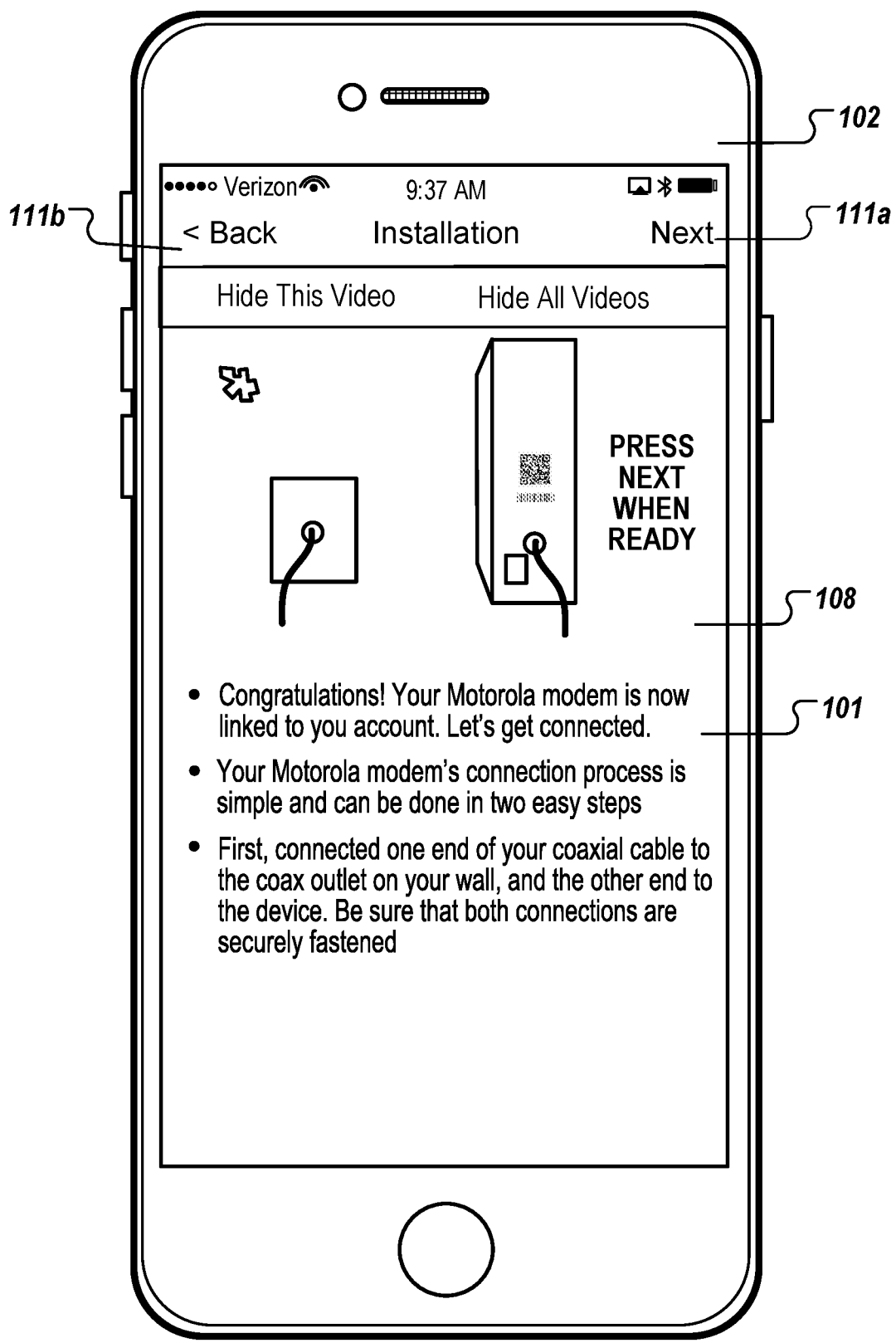

FIG. 1E depicts a connection phase. The integrated video 108 shows the user what wiring to connect and where to connect it based on the information received via the camera interface 110 and the image capture window 109 upon scanning of the modem. As demonstrated in FIG. 1E, the integrated video 108 instructs the user on what action to take within the dynamic user interface 101. The video control module can cause the integrated video 108 to pause until the user takes a certain action within the dynamic user interface 101. The video control module can be configured to resume playing the integrated video 108 upon receipt of notification that the user has selected the dynamic next element 111a. If, for example, the user selects the dynamic back element 111b, the video control module can select the prior video for replaying as the integrated video 108.

Figure 1F:
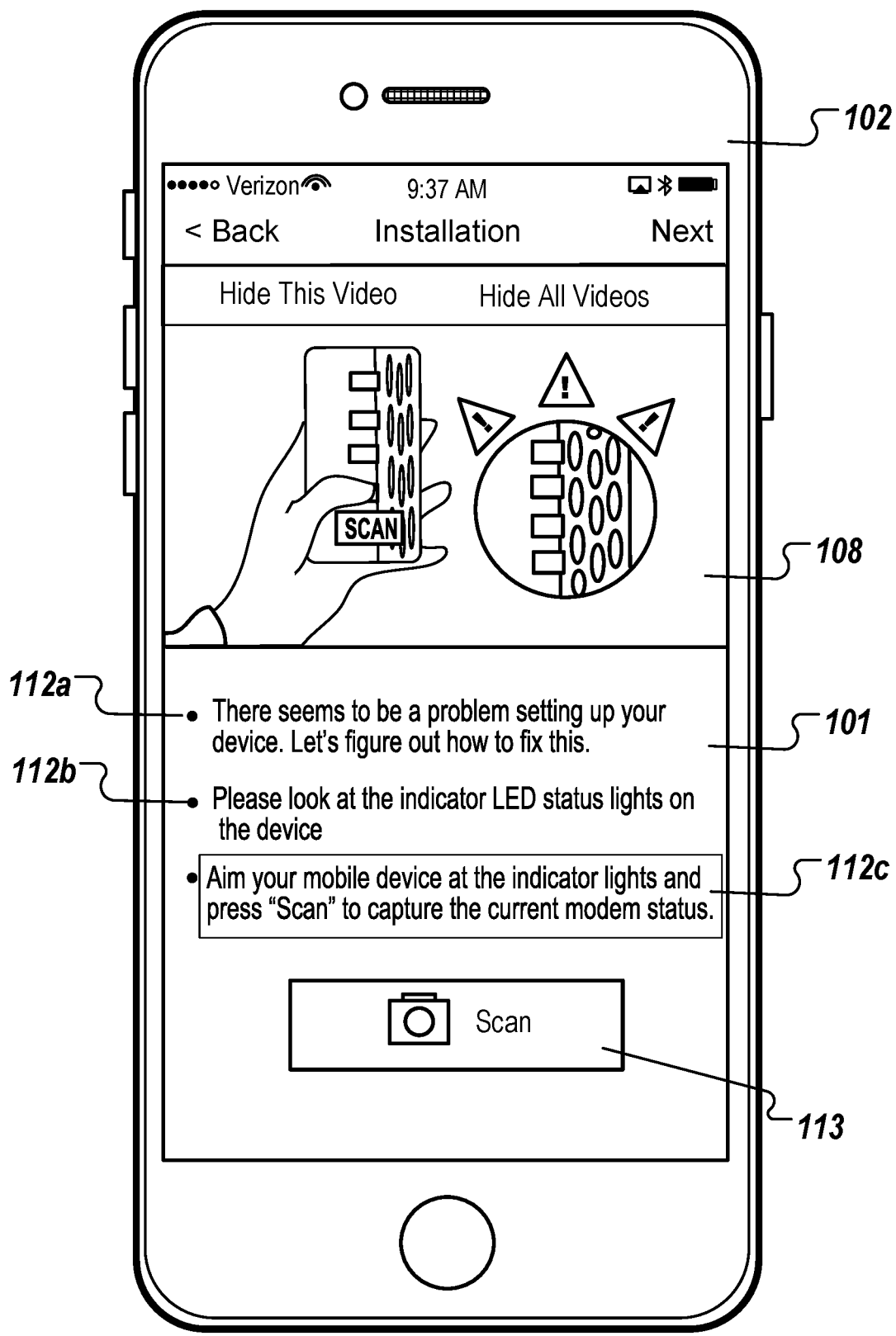

FIG. 1F depicts a trouble shooting segment of the integrated video 108. Once the user connects the modem, the dynamic user interface 101 may receive an update on whether the modem is properly corrected. For example, the dynamic user interface 101 may be configured to search for the modem following the connection video and selection of the dynamic next element 111a of FIG. 1E. If, for example, no connection is detected, the video control module may be activated to select a trouble shooting video segment as demonstrated in FIG. 1F. The trouble shooting video segment can request the user to capture a particular image of the modem device. The dynamic instructional text elements 112a-112c are generated within the dynamic user interface 101 to instruct the user as the trouble shooting video segment of the integrated video 108 plays. The dynamic scan element 113 is used to help diagnose the connection problem.

Figure 1G:
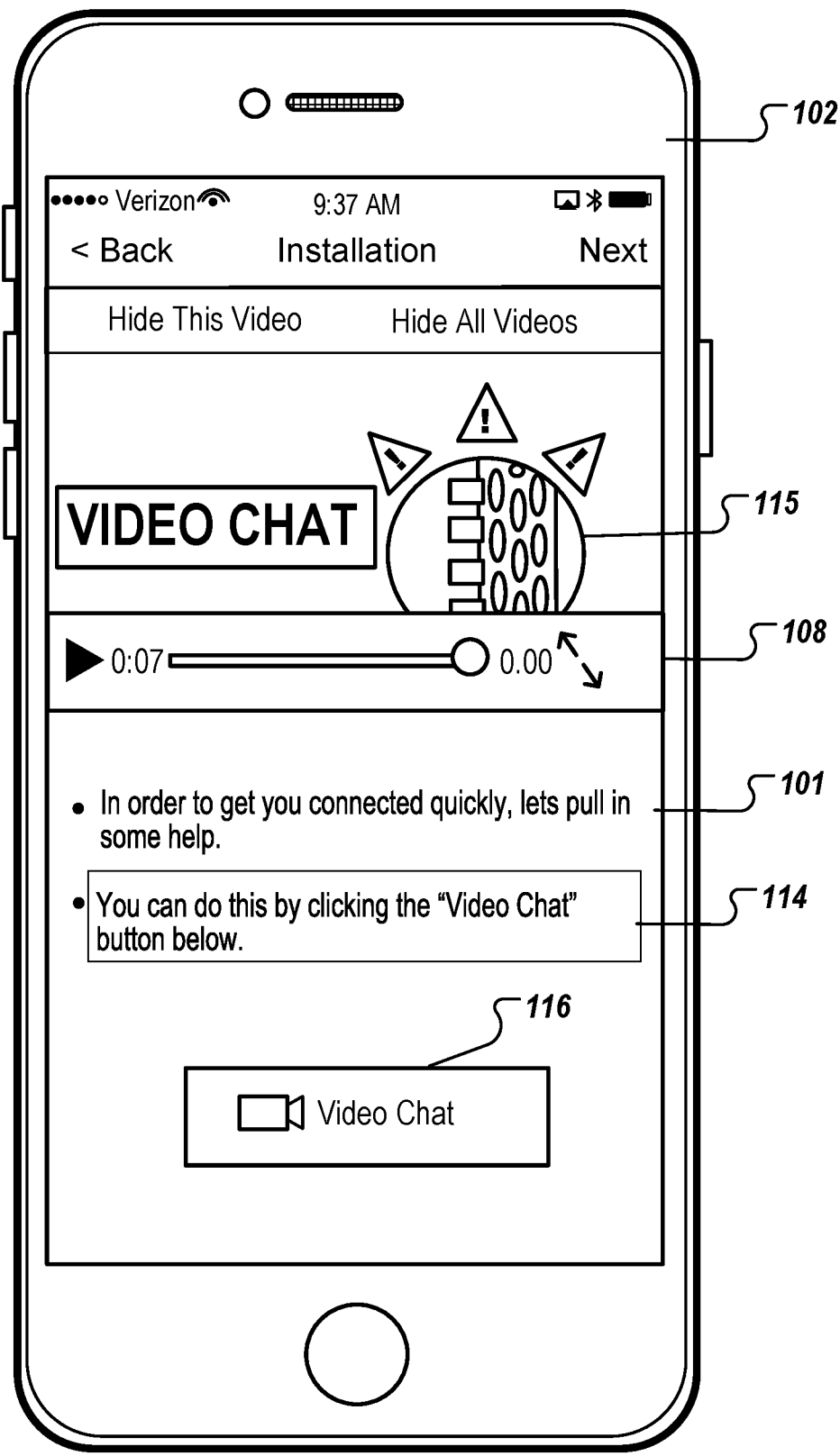

FIG. 1G shows a video chat segment of the integrated video 108, which segment, may be selected or spliced into the integrated video based on the dynamic scan element 113 indicating that an error is present. As the video chat segment of the integrated video is played, the dynamic elements 114 may prompt the user to select to video chat with an agent via selection of the video chat icon 116 presented within the dynamic user interface 101. Selection of the video chat icon 116 causes a video chat window 115 to be opened as a modal. The video chat window 115 can be opened inside the dynamic user interface 101 in certain implementations. Through the video chat window 115, the user is connected to a live agent that can view the user via a camera device of the mobile electronic computing device 102.

Figure 1H:
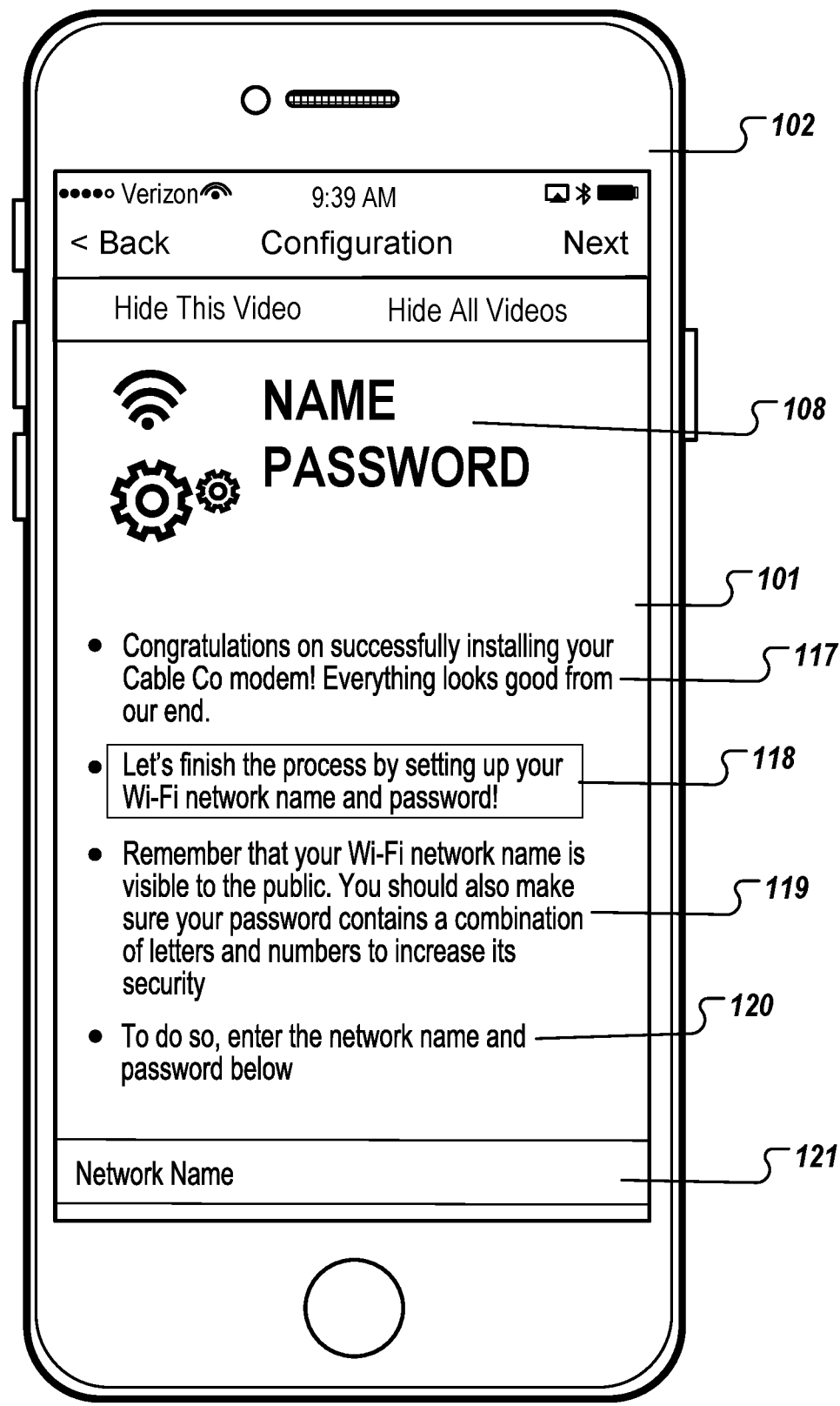

FIG. 1H depicts an example WI-FI set-up dialog boxes into which the user can input a name and password. Alternatively, the user can enter the network name and password directly on the video itself. The dynamic elements 117-120 walk the user through the steps while the dynamic input element 121 provides the interface for the user to input data. The password text input is not shown here because the dynamic input element 121 implements a scroll view.

Figure 1I:
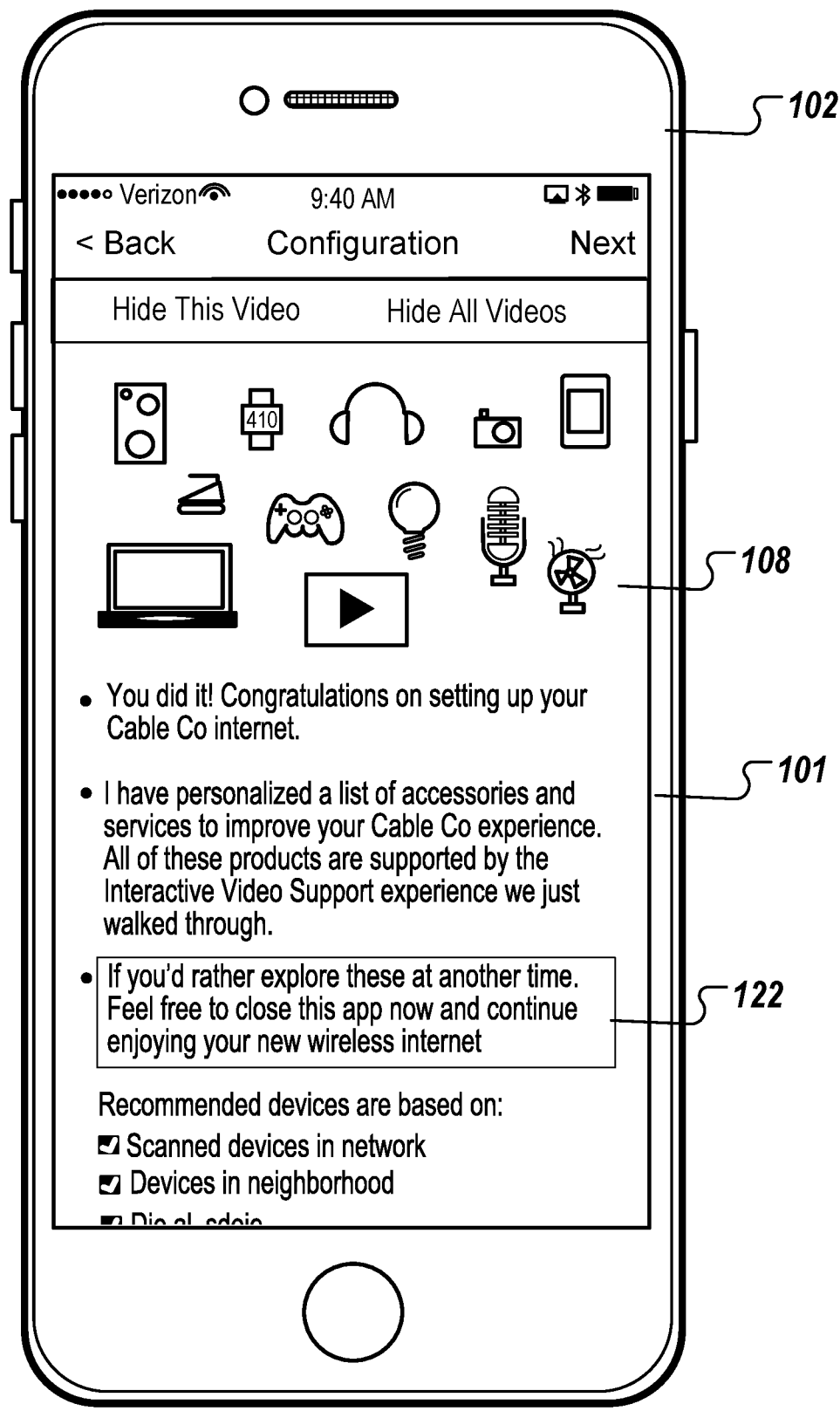

FIG. 1I depicts the final segment of the integrated video 108, which is prompted for play after the setup is complete and is coordinated with instructions provided via dynamic text elements 122.

Figure 2:
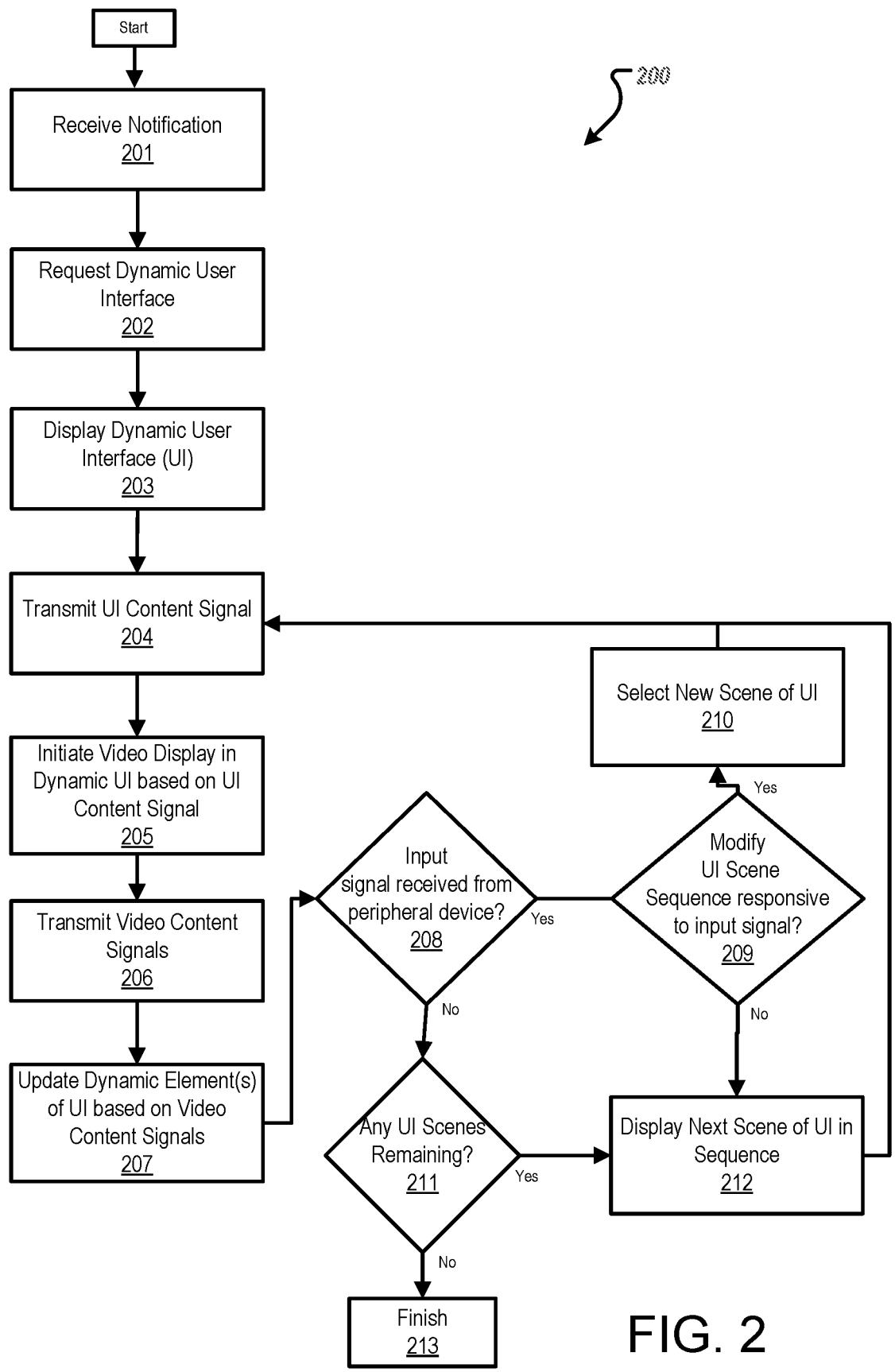
FIG. 2 depicts an example process that can be executed in implementations of the present disclosure.

FIG. 2 depicts an example process that can be executed according to implementations of the present disclosure. In some examples, the example process 200 is provided by one or more computer-executable programs that are executed using one or more computing devices. For example, the example process 200 is provided by a mobile application that is downloaded to and installed on a mobile computing device (e.g., a smartphone), and that enables a user to interact with the dynamic user interface platform of the present disclosure. A delivery notification or other notification is received (201) by the application. For example, a back-end system may transmit the notification by e-mail, SMS, or other electronic communication to the user. The message may include a deep linking option that when selected causes the application to run on the mobile electronic computing device. Once the initiation communication is received at 201, the application requests (202) generation of a dynamic user interface on the mobile electronic computing device. The dynamic user interface is displayed (203) based on the specific notification and request received. For example, if the notification indicates that a modem was received, the content of the user interface can be different than if the notification indicates that smart programmable thermostat was received. The content of the dynamic user interface displayed generates a user interface content signal that is transmitted (204). As discussed herein, the user interface content signal is analyzed to determine the appropriate integrated video segment(s) for playing within the dynamic user interface. The integrated video is played (205) based on the information obtained from the user interface content signal. As the integrated video is played, video content signals are generated and transmitted (206). The video content signals are used to guide the further content, sequence, and adjustments of the dynamic user interface. As the content in the video changes, the dynamic elements of the dynamic user interface are updated (207). For example, as the video moves from discussing connecting particular wires to capturing an image, the dynamic elements may change from text based instructions to an interface with the camera of the mobile electronic computing device. As another example, as the video moves through a series of instructions distinct text fields may be highlighted based on the video sequence and/or user selections. The application may analyze (208) other inputs as the dynamic elements are modified and the integrated video is played. For example, one or more peripheral devices may be implemented during operation to obtain sound inputs, via a microphone, image and/or video inputs via the device camera. In certain implementations, the image inputs can be used to scan a barcode to identify a particular device in question and then be used to customize the following videos to address that device (instead of a generic device). The peripheral devices can be used to provide input based on the current attitude and emotional state of a user, which may be determined by the camera, or microphone, heart rate monitor, or other sensor on the device, which may be used in concert with a face recognition or voice detection analysis system. In certain implementations, input may be obtained via a voice or text based questionnaire.

In certain implementations, the image inputs can be used for photo analysis, for example for photo analysis of the LED status lights of a device to figure out which troubleshooting video and user interface elements to present to the user. Based on the analysis of any input signal received, the application determines (209) whether to modify the dynamic elements of the user input. If, for example, the input indicates a new or different device has been delivered, a different user interface can be selected (210) than previously expected based on the delivery notification. In some cases, the input may not modify the user interface sequence, in which cases, the application will simply display (212) the next user interface elements required by video content and user select. The selection of either the expected user interface sequence or the modified user interface sequence prompts further transmission (204) of the user interface content signal so the appropriate integrated video can be played within the user interface. If analysis 208 indicates that an input signal from a peripheral device is not received and analysis 211 determines that the end of the user interface sequence has been reached, the application will finish (213) and close. If analysis 208 indicates than an input signal has not been received, but there are still further instructions to be displayed, the application will display (212) the next scene of the user interface.

In certain implementations, inputs may be received directly through a dynamic element of the video. For example, the video may present a selectable button as a part of the video. Selection of the button will cause specific video content signals to be transmitted (206), which signals can cause the user interface to be updated (207). Similarly, when a text field is presented as part of the video, that text field can be used directly to input text.

In certain implementations, other user interface widgets can also be presented as part of the video and can be interacted with directly.

In certain implementations, the application is connected to a back-end system. Common errors by users can be tracked and logged in this back-end system. Maintaining a database of these common errors, particularly if cataloged, can help the application guide the users in a more targeted manner. New video content can be added to the application based on these errors to help users identify errors that many other users make.

Figure 3:
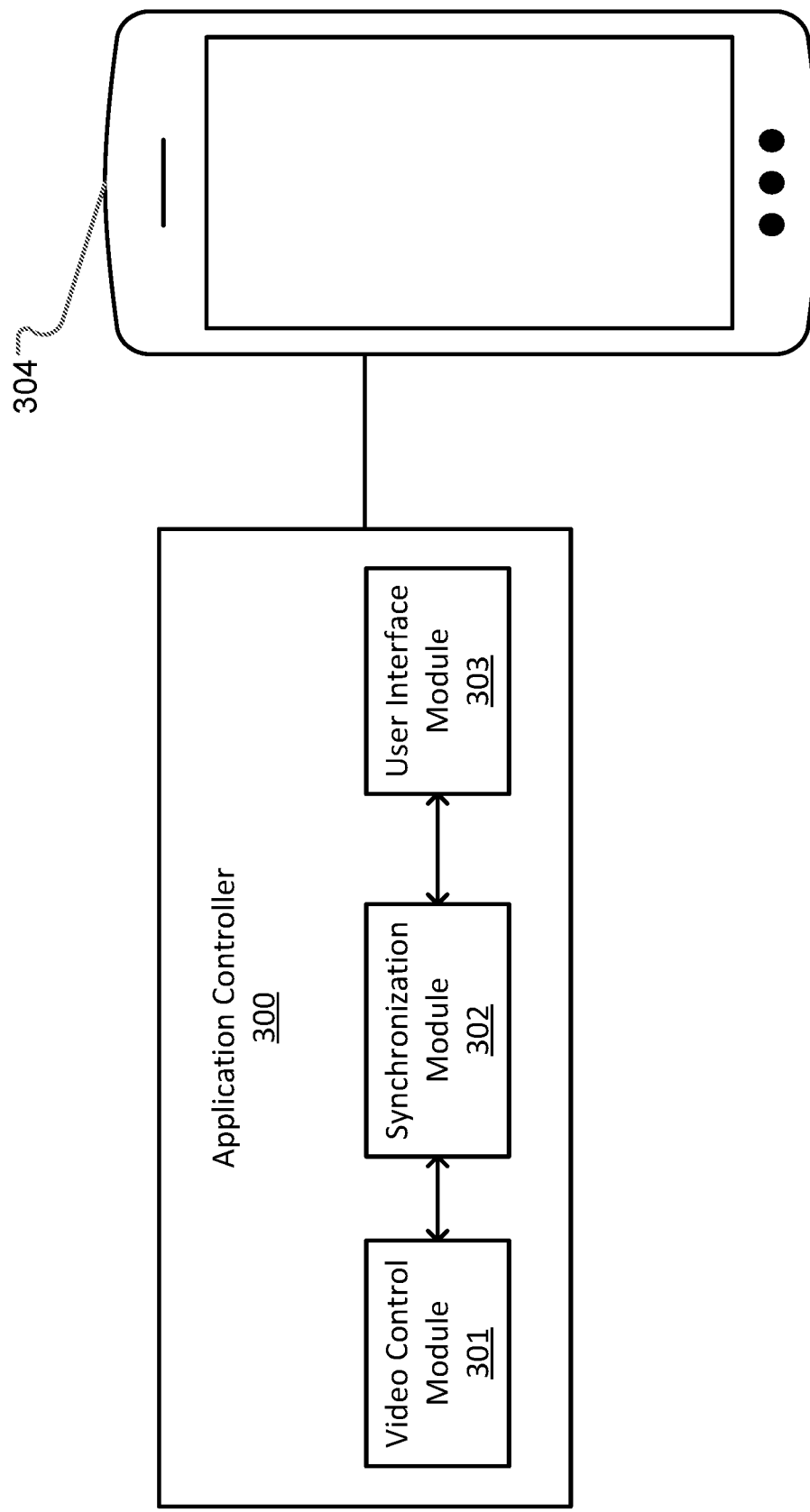
FIG. 3 depicts an example system for executing implementations of the present disclosure.

FIG. 3 depicts an example system for executing implementations of the present disclosure. An application controller 300 may be run on one or more processors on mobile electronic computing device 304. The application controller includes a video control module 301 communicably coupled to a user interface module 303 via the synchronization module 302. The synchronization module obtains information from the video control module and the user interface module to coordinate and update the integrated video display and the user interface elements in the appropriate sequence based on inputs received through the user interface and based on the status of the video content. In some implementations, some operations of the application controller may be completed through a computing device remote from the mobile electronic device 304. Information obtained via the application controller may be transmitted to and/or stored on one or more remote servers that the mobile electronic device 304 is configured to communicate with.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical user interface or a Web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

Thus, particular implementations have been described. Other implementations are within the scope of the following claims. For example, the actions recited in the claims may be performed in a different order and still achieve desirable results.

What is claimed is:
1. A system, comprising:
an electronic device; and
a computer-readable storage medium coupled to the electronic device and having instructions stored thereon which, when executed by the electronic device, cause the electronic device to perform operations comprising:

causing the electronic device to display a dynamic user interface comprising a video interface portion for displaying a video providing guidance relative to a device delivered to a user, the device delivered to the user being different than the electronic device displaying the dynamic user interface;

causing the video to play within the video interface portion of the dynamic user interface, the video depicting a first type of device defined in shipping information in a delivery notification;

providing a video status indicator that is unique to instant content depicted in the video, the video status indicator being automatically provided in response to data encoded in the video indicating that user input is to be provided in response to the instant content;

adjusting, in response to the video status indicator and while the video continues to play within the video interface portion, the dynamic user interface to concurrently display the video interface portion and a user interface portion for receiving user input;

receiving, while the video continues to play, data from a peripheral device provided in the electronic device in response to user input to the user interface portion of the dynamic user interface the peripheral device comprising one or more of a microphone of the electronic device and a camera of the electronic device; and determining, while the video continues to play, that the data indicates that the device delivered to the user is a second type of device, different from the first type of device, and in response the user interface scene is modified to represent the second type of device instead of the generic device.

2. The system of claim 1, wherein a user interface status indicator is provided based on receipt of a initial user input.

3. The system of claim 2, wherein the video is selected from a plurality of videos based on the initial user input.

4. The system of claim 1, wherein the dynamic element is configured to change colors.

5. The system of claim 1, wherein the dynamic element includes a pointer.

6. The system of claim 1, wherein the video status indicator is provided in response to receipt of an input signal from a back-end system.

7. The system of claim 6, wherein the back-end system generates the input signal in response to a delivery confirmation.

8. The system of claim 1, wherein the peripheral device includes a barcode scanner.

9. The system of claim 1, wherein the peripheral device includes a heart rate monitor.

10. The system of claim 1, wherein the video status indicator is provided in response to receipt of an input signal from a historic database having a data set of prior user error data stored thereon.

11. A computer-implemented method executed by one or more processors of an electronic device, the method comprising:

causing, by the one or more processors, the electronic device to display a dynamic user interface comprising a video interface portion for displaying a video providing guidance relative to a device delivered to a user, the device delivered to the user being different than the electronic device displaying the dynamic user interface;

causing, by the one or more processors, the video to play within the video interface portion of the dynamic user interface, the video depicting a first type of device defined in shipping information in a delivery notification;

providing, by the one or more processors, a video status indicator that is unique to instant content depicted in the video, the video status indicator being automatically provided in response to data encoded in the video indicating that user input is to be provided in response to the instant content;

adjusting, by the one or more processors and in response to the video status indicator and while the video continues to play within the video interface portion, the dynamic user interface to concurrently display the video interface portion and a user interface portion for receiving user input;

receiving, while the video continues to play, data from a peripheral device provided in the electronic device in response to user input to the user interface portion of the dynamic user interface the peripheral device comprising one or more of a microphone of the electronic device and a camera of the electronic device; and determining, while the video continues to play, that the data indicates that the device delivered to the user is a second type of device, different from the first type of device, and in response the user interface scene is modified to represent the second type of device instead of the generic device.

12. The method of claim 11, wherein the dynamic user interface is displayed in response to receipt of a delivery notification from a back-end system.

13. The method of claim 11, further comprising:
capturing an image from a camera device of the electronic computing device;
analyzing the image; and
changing the display content of the dynamic user interface based on the analysis.

14. The method of claim 11, wherein adjusting the dynamic element comprises highlighting text.

15. A non-transitory computer-readable storage medium coupled to one or more processors and having instructions stored thereon which, when executed by the one or more processors, cause the one or more processors to perform operations comprising:

causing the electronic device to display a dynamic user interface comprising a video interface portion for displaying a video providing guidance relative to a device delivered to a user, the device delivered to the user being different than the electronic device displaying the dynamic user interface;

causing the video to play within the video interface portion of the dynamic user interface, the video depicting a first type of device defined in shipping information in a delivery notification;

providing a video status indicator that is unique to instant content depicted in the video the video status indicator being automatically provided in response to data encoded in the video indicating that user input is to be provided in response to the instant content;

adjusting, in response to the video status indicator and while the video continues to play within the video interface portion, the dynamic user interface to concurrently display the video interface portion and a user interface portion for receiving user input;

receiving, while the video continues to play, data from a peripheral device provided in the electronic device in response to user input to the user interface portion of the dynamic user interface the peripheral device comprising one or more of a microphone of the electronic device and a camera of the electronic device; and determining, while the video continues to play, that the data indicates that the device delivered to the user is a second type of device, different from the first type of device, and in response the user interface scene is modified to represent the second type of device instead of the generic device.

\* \* \* \* \*